United States Patent [19]

Laureau

[11] 3,908,692
[45] Sept. 30, 1975

[54] AUTOMATIC WATER SUPPLYING APPARATUS FOR A VEHICLE EQUIPPED WITH A SPRINKLER BANK

[76] Inventor: Maurice Laureau, 7, Rue du Lieutenant Boulay Pringy, 77310 St. Fargeau Ponthierry, France

[22] Filed: Jan. 24, 1974

[21] Appl. No.: 436,092

[30] Foreign Application Priority Data
Jan. 24, 1973   France .............................. 73.02528

[52] U.S. Cl. ........................................... 137/355.16
[51] Int. Cl.² ................... A01G 25/02; B05B 15/06
[58] Field of Search .................. 137/355.16, 355.17

[56] References Cited
UNITED STATES PATENTS
3,590,854   7/1971   Cork .............................. 137/355.16

*Primary Examiner*—Henry T. Klinksiek
*Attorney, Agent, or Firm*—Stevens, Davis, Miller & Mosher

[57] ABSTRACT

A water supply apparatus for a vehicle bearing sprinkler equipment including a stationary facility located on the ground and consisting of a line of pipes having from place to place a water outlet closed by a spring-valve, and a movable facility borne by the vehicle and comprising two water taps which will alternately connect to the outlets, and two flexible hoses linking each of the taps to a common collector.

7 Claims, 12 Drawing Figures

AUTOMATIC WATER SUPPLYING APPARATUS FOR A VEHICLE EQUIPPED WITH A SPRINKLER BANK

The invention relates to sprinkler apparatus mounted on a cart or vehicle in order to be moved while water distribution takes place so as to very systematically sprinkle a large area.

In order to secure such supply of water, stationary pipe facilities of the known type will be unsuitable in view of the continuous displacement of the vehicle. Further, in order to solve the problem, pipes are used which are open along a generatrix and which are provided with a movable jointing device such as described in French Pat. application No. 204348 in the name of the applicant, or else make use of semi-rigid or flexible hoses mounted on spools and which are unwound or dragged over the ground while securing supply continuity through the center of the spool. The pipes or hoses of the first kind have the disadvantage that there will be lack of sufficient tightness when the very high pressures being increasingly used are applied; as regards the pipes or hoses of the second type, they lead to very bulky spools of great weight and suffer from friction and high wear when the hose or pipe is dragged over the ground.

The object of the invention is to eliminate the above drawbacks by creating a water supply apparatus consisting solely of rigid pipes, which are stationary and located on the ground, and of flexible hoses of short lengths which are mounted on the vehicle but ensure supply continuity.

The supply apparatus of the invention comprises a stationary pipe facility located on the ground and provided at regular spaces with a water outlet normally closed by means of a spring valve; two water taps which are supported and guided by the vehicle along a straight path parallel to the hose line and to the vehicle advance line, each of these water taps being connected to the sprinkler water supply by a hose itself supported and guided by the vehicle, a cable return device ensuring forward displacement of the unconnected tap as the tap connected to an outlet moves toward the rear of the vehicle on account of the latter's advance, and means for crossing without collision the two water taps when they are at mid-course so that when the unconnected tap meets a new outlet, there will be automatic hook-up between said tap and said outlet with simultaneous release of the previous tap from the corresponding outlet.

Other characteristics of the invention will be made clear in connection with the description below of an illustrative embodiment shown on the attached drawings.

As shown by these figures, the water supply apparatus of the invention essentially consists of a fixed facility located or deposited on the ground and of a movable facility installed on the vehicle and operating with the former.

Figure 1:
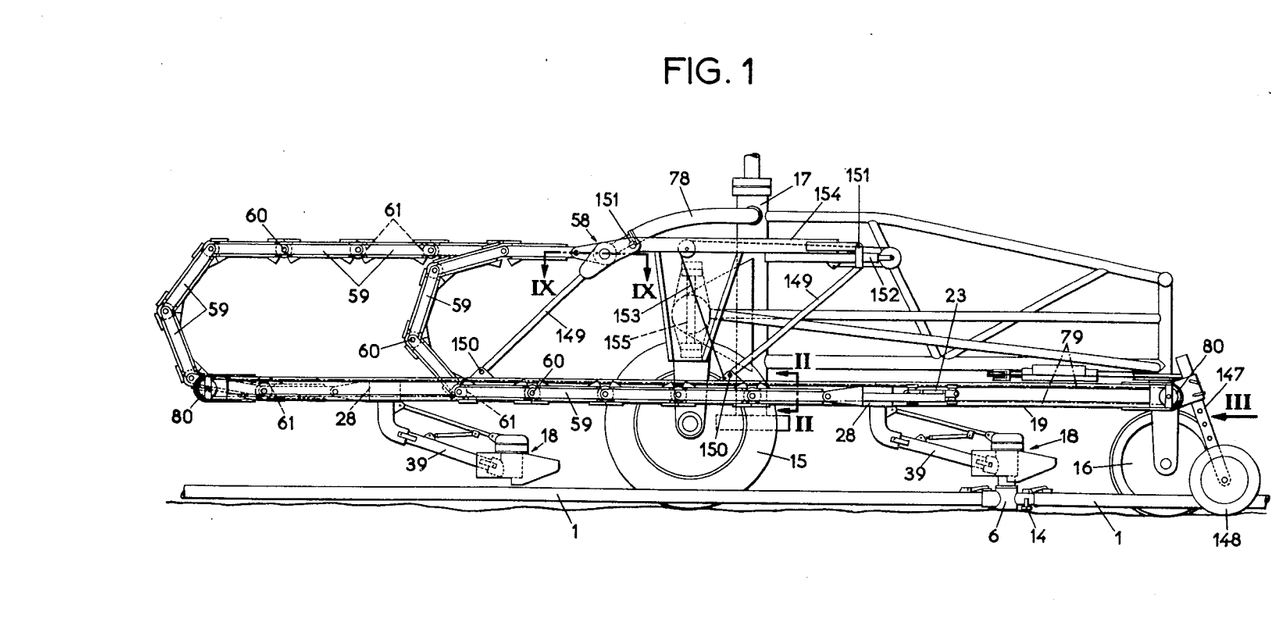
FIG. 1 is an elevation of the entire apparatus mounted on the cart but without the sprinkler bank.
Figure 6:
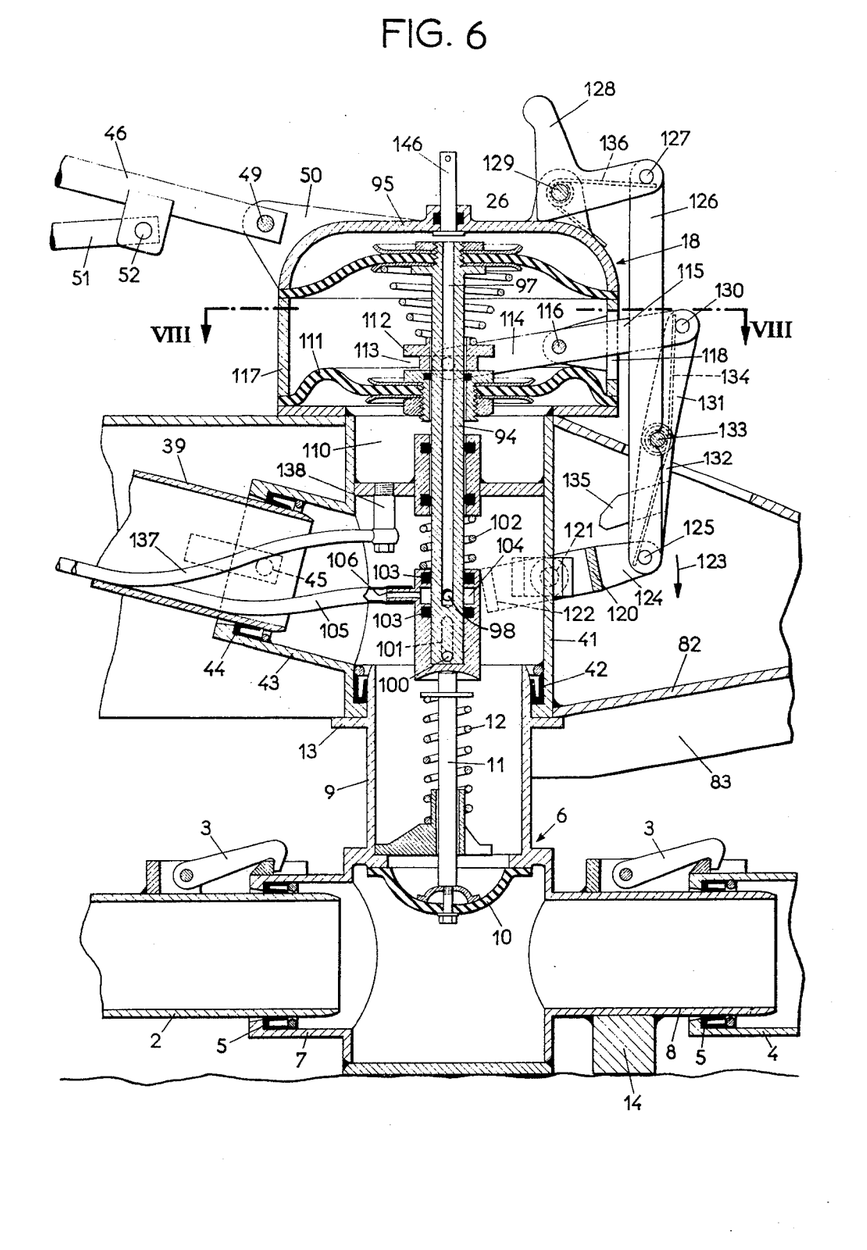
FIG. 6 is an axial cross-section of a water outlet and of an automatic hook-up tap.

As shown notably in FIGS. 1 and 6 the stationary facility comprises a set of metal pipes 1 each terminated by a male and 2 equipped with a locking means 3 and with a female end 4 provided with a hermetic seal 5. From place to place, or at every joint between two pipes 1, if the latter are very long, e.g., of the order of nine meters, as is the case most frequently in practice, the two ends are hooked up by the intermediary of a water outlet 6 comprising a female end 7 and a male end 8 extending one in the other and meant to respectively hook up with ends 2 and 4 of the pipes. This water outlet further comprises a vertical terminal 9 and a valve 10 ganged to a rod 11 which is coaxial with terminal 9, the valve 10 pressing against a seat in order to ensure sealing of the outlet under the influence of the water pressure and also under the action of a spring 12. Terminal 9 further comprises a coupling flange 13; and a cross bar 14 at the bottom of the mechanism prevents tipping.

A sprinkling line within areas under cultivation and which should be watered may thus by made up by means of these components, i.e., pipes 1 and outlets 6, this line or path then being followed by the sprinkling vehicle.

The sprinkling vehicle is shown in toto in FIG. 1. It comprises drive wheels 15 and at least one steering wheel 16. The vehicle is equipped at its center with a post 17 for the sprinkler bank (not shown), which may be rotating or stationary, this post also serving for the equivalent sprinkling apparatus. The water supply to this post 17 is ensured in the invention by a movable facility functioning in concert with the previously mentioned stationary facility. The former essentially comprises two identical water taps 18 which are to hook up alternately with one of the outlets 6, further means for supporting, guiding and displacing these two taps, and means for securing their permanent hydraulic connection with post 17.

Figure 2:
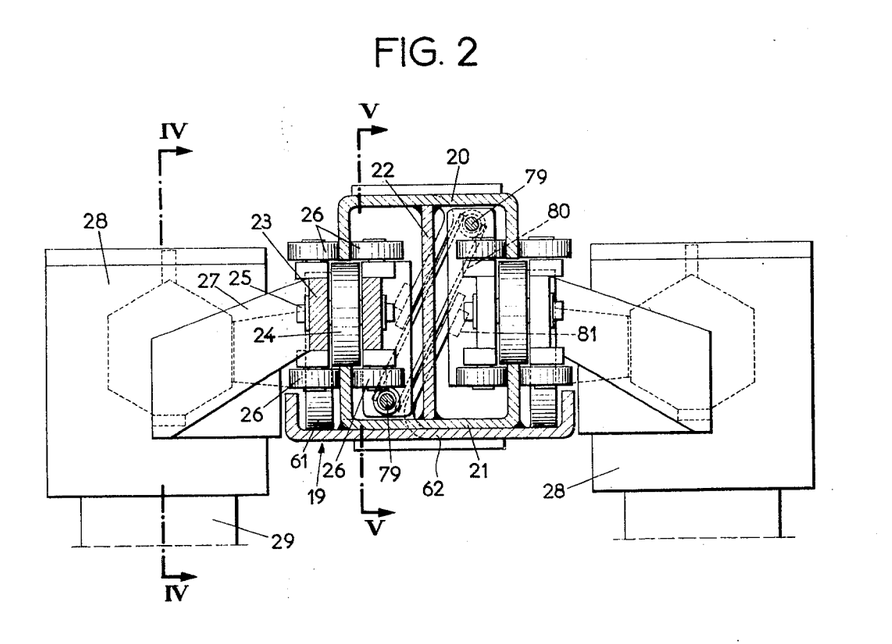
FIG. 2 is a cross-section on a larger scale and along line II—II of FIG. 1.

In the embodiment shown, this guidance and support function is assumed by a lengthwise beam 19 shown in section in FIG. 2 and made up of an upper U-shaped member 20 and of an identical lower U-shaped member 21, both being jointed by a welded web 22 or by succeeding web segments. The whole is symmetrical with respect to a vertical axis corresponding to web 22. A cart 23 comprising two support wheels 24 with axle 25 and rolling between the edges opposite the flanks of upper member 20 and lower member 21 may move on either side. This cart also comprises eight vertical axis rollers 26 which guide the cart against the edges of these flanks and oppose any tilting.

Figures 4, 5:
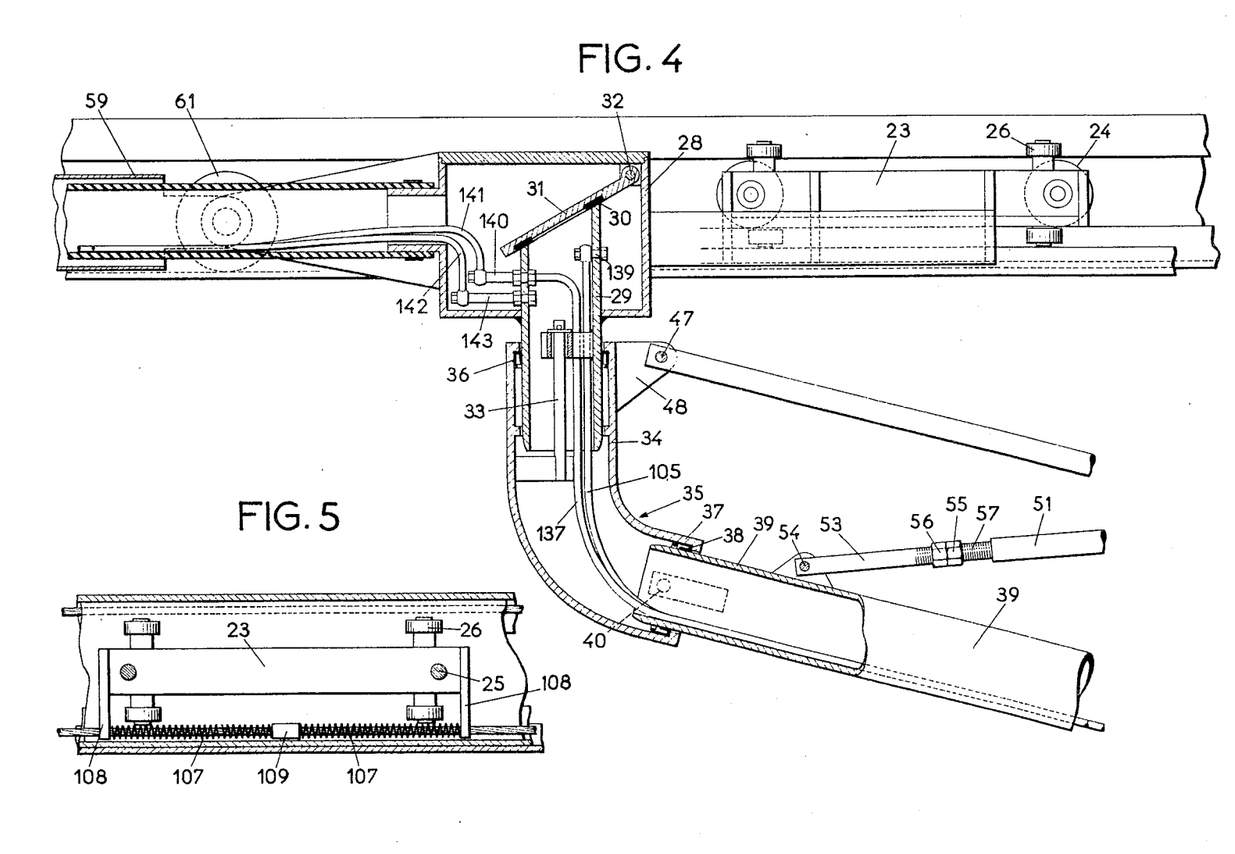
FIG. 4 is a longitudinal section along line IV—IV of FIG. 2.
FIG. 5 is a longitudinal section along line V—V of FIG. 2.
Figure 7:
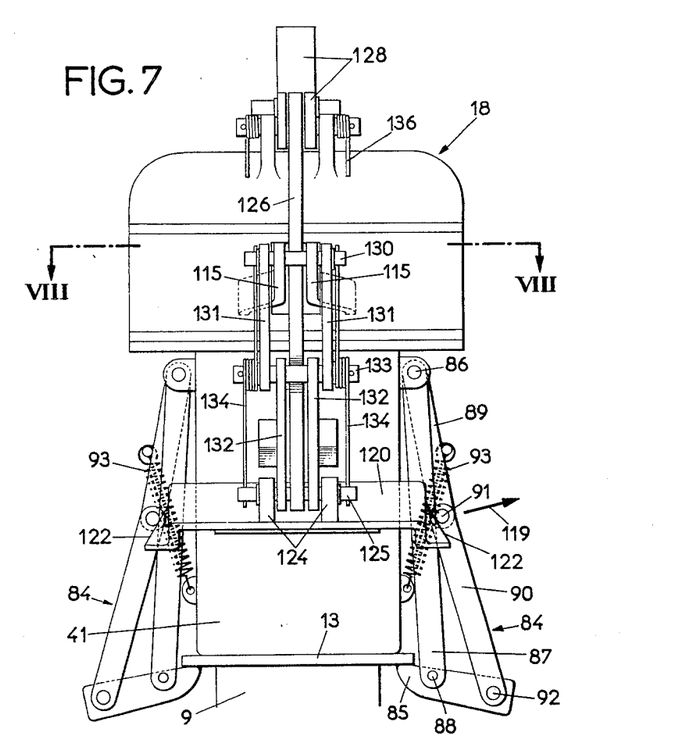
FIG. 7 is an elevation along line VII of FIG. 6.
Figure 8:
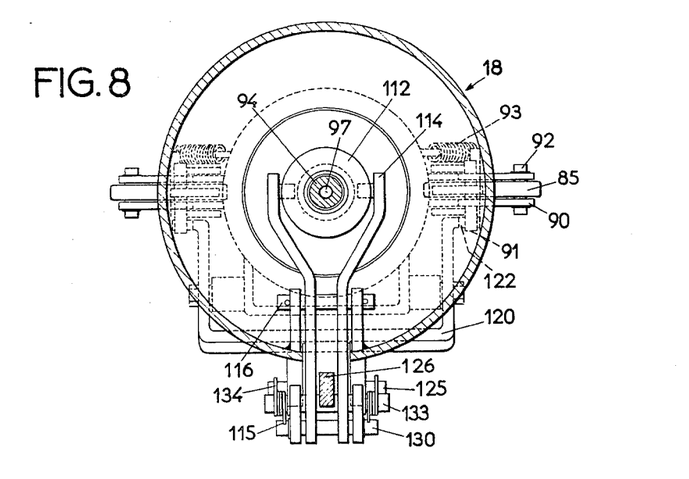
FIG. 8 is a horizontal section along line VIII-VIII of FIGS. 6 or 7.

Each cart comprises an arm 27 provided with a valve box 28, for instance of parallelipipedic shape, and shown for example in FIG. 4, to which is jointed a segment of vertical pipe 29. The skewed upper end 30 of this pipe serves to seat a valve 31 which is hinged at 32 in box or case 28. The upper end 34 of an elbow 35 hinges at the lower end of pipe 29, pivoting about a vertical axle 33, and hermetically hooking up with pipe 29 by means of seal 36. The lower end 37 of this elbow 35 also comprises a hermetic seal 38 which joins a segment of pipe 39 in the shape of an arm and hinging about a transverse axis 40 with respect to elbow 35. Each of these arms 39 at its end comprises one of the water taps 18, which were previously mentioned and are shown in FIGS. 6, 7 and 8.

Each water tap comprises a vertical pipe segment 41 with a lower hermetic seal 42 for joining the upper end of terminal 9 of a water outlet 6, above flange 13. Laterally, this segment 41 comprises a connector 43 also equipped with a hermetic seal 44 for the end of arm 39, the end hinging about an axle 45 which is transverse with respect to this connector. An upper tie-rod 46, jointed at 47 in a clevis 48 ganged to elbow 35 and at 49 in a clevis 50 rigidly connected to the upper part of the water tap, completes the jointed parallelogram so as to keep water tap 18 constantly vertical. In ancillary manner, a telescoping tie rod consisting of a pipe segment 51 hinging at 52 about tie-rod 46 and of a rod 53 jointed at 54 about the arm 39 and holding a lock nut 55 for locking on threaded part 57 sliding inside tube 51, allows adjusting the minimum length of the tie rod so as to stop the downward motion of each water tap 18 at the desired height.

In order to secure the hydraulic hook-up of each water tap with the post 17 for any cart 23 displacement, flexible hoses linking each of boxes 28 with a common upper junction 58 are used. Each of these hoses may consist of a series of tubular links 59 of hexagonal cross-section and hinging with respect to each other at 60 and equipped with stop means for the various hinges so as to restrict the curvature to a minimum value as regards one direction and to keep within the rectilinear array in the other. Furthermore, the links nearest to each valve box 28 are provided with one roller 61 each along their hinging axes, the rollers being located near beam 19 and rolling in the projection of a U-shaped member 62 welded below the lower U-shaped member as shown in FIG. 2. In this manner, each chain all the time will be like a prone U with unequal arms, the lower one being supported by the beam through rollers 61, the back of the U being of the least radius of curvature allowed by the chain and the upper branch being straight because of its weight and angular limitation. A flexible hose illustratively is located inside each of these chains, ensuring hermeticity.

Figure 11:
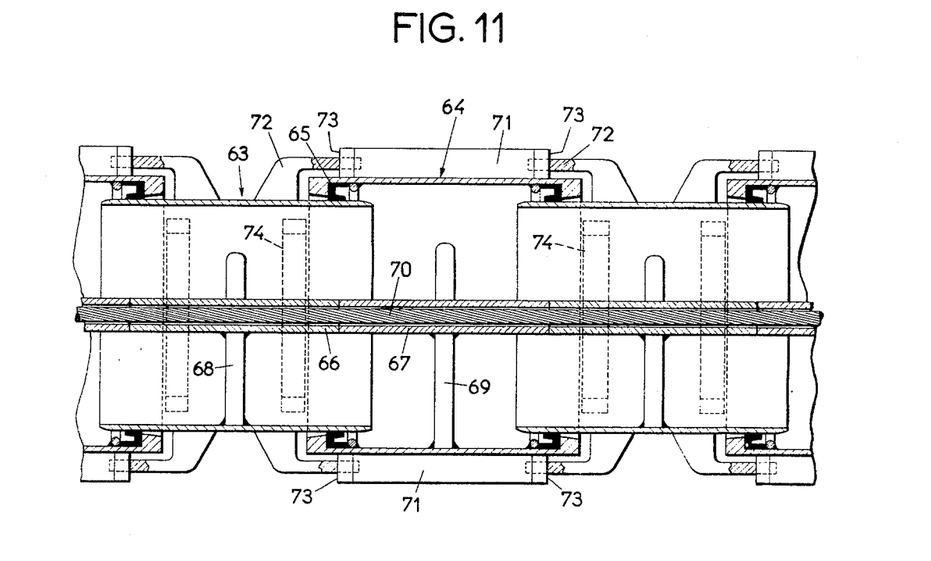
FIGS. 11 and 12 show a variation in the embodiment of the jointed conduits in horizontal section along line XI—XI of FIG. 12 and in elevation, respectively.
Figure 12:
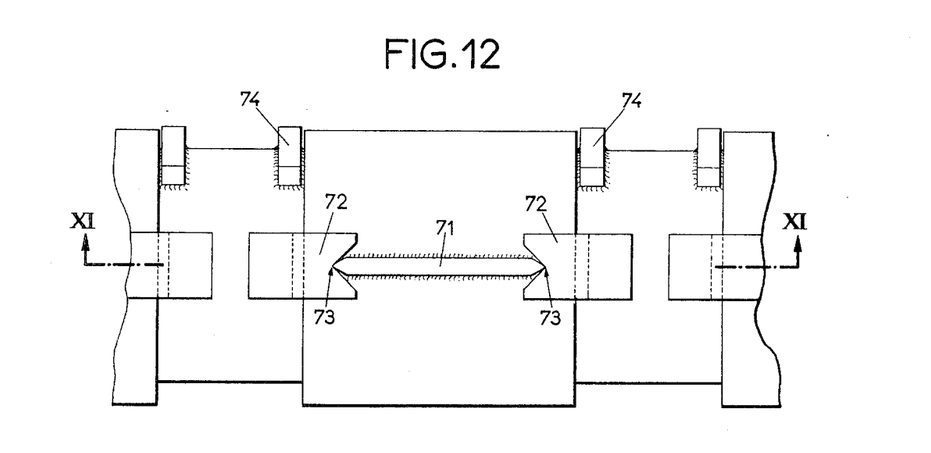

As a variation, each hinged pipe might be achieved as shown in FIGS. 11 and 12. In this case, the flexible hose is eliminated and the links consist alternatively of male parts 63 made of a segment of tubular pipe, and of female parts 64, also made of a segment of tubular parts, but of slightly larger diameter with a shoulder at each end for a hermetic seal 65, each of those seals ensuring the joining between a male and a female part. Furthermore, each segment 63 or 64 comprises a tubular segment of small diameter along its axis, referenced respectively by 66 and 67, each fastened to the corresponding earlier said segment by radial arms 68 or 69. The separation between two segments 66 and 67 corresponds to the plane of the associated seal 65. Lastly, a steel cable 70 passes through all tubes 66 and 67 and succeeding ones so as to secure on one hand opposition to the extension tendency of the jointed conduit under the influence of the water pressure and on the other hand hinging at the various junctions by means of cable bending.

However, such a pipe may be jointed in any plane and may also be subject to torsional motions. As regards the present application, torsion may be eliminated and the desired jointing may be obtained by means of small rods 71 welded on the female parts along two diametrically opposite generatrices, which are terminated in knife blades and operate together with the V-shaped clevises 72 that are welded on the male parts, the line joining the corresponding two knife blade ends 73 also being located in the plane of the seal and of the junctions between central pipes 66 and 67. The cable tension is enough to maintain contact and to ensure perfect jointing. In order to restrict angular swings, arc-shaped parts 74 may be welded to one or both sides of the male parts.

In any case, the first chain link will be fastened and hydraulically connected to one of the vale cases 28, whereas the last chain link will be fastened and connected to hook-up terminal 75 of a rotating connector 76, the two connectors corresponding to the two chains rotating about one and the same collecting pipe 77 passing the water through a flexible hose 78 to the previously mentioned base 17.

In order to secure automatic displacement of water taps 18, the two carts 23 associated with the two taps are linked by a cable 79 returned to the front of beam 19 on a pulley 80 with an oblique axis 81, shown in dashed lines in FIG. 2. In this manner, when one of taps 18 is connected to an outlet 6 and therefore is in relative backward motion on account of the vehicle advance, the cable return will cause the other tap 18 to move forward with the same speed relative to the vehicle, that is, at a speed which is twice that when considered with respect to ground.

In the embodiment illustrated, the forward cable return is completed by another rearward one so as to avoid slackening of tension and cable tangling, this set of two thus constituting in a way an endless cable; however this refinement is of optional nature.

When water tap 18 advancing under the influence of cable traction meets that tap 18 which is connected to an outlet 6, collision between the two taps will be avoided due to the previously mentioned rotating assembly. This is so because the free tap will slide along arm 39 of the connected tap and will laterally step out of the way and then return into the axis of pipe 1 and of beam 19 after overshooting, the return being effected by an elastic means not shown which acts on the rotation of elbow 35 with respect to the valve box 28.

As shown in FIGS. 1 and 6, each of the water taps 18 is equipped at the front with an inclined plane 82 provided with two lower edges 83 flaring out forwardly and narrowing rearwardly in the manner of a funnel, until being of that width corresponding to the diameter of flange 13. In this manner, when the free tap 18, which as seen above overshoots the tap 18 which is connected to the outlet, meets the next outlet, it will rise on the latter because of its inclined plane sliding on the upper end of the outlet, and will simutaneously center itself on the outlet because of its edges 83. This motion is allowed in view of the pivoting assembly of elbow 35 and because of the previously mentioned elastic return means.

When the lower orifice of conduit 41 thus arrives precisely above the end of terminal 9 of the outlet, the whole of water tap 18 under the influence of its weight and of arm 39 will fall back, so that the automatic connection mechanism for the new tap and the disconnection of the old connected one will be tripped.

To obtain this, each water tap 41, as shown in FIG. 7, comprises on both sides automatic pawls 84 each consisting of a lower part 85 linked to an upper joint 86 by a fixed length tie rod 87 jointed at 88 to part 85 and by a compass formed by two small bars or links 89 and 90 jointed together at 91, bar 89 also being jointed at 86, whereas bar 90 is jointed at 92 at the end of part 85. A return spring 93 is mounted between bar 89 and part 41 so as to constantly bring back each of the automatic pawls to the position shown in FIG. 7. When in this rest position, axle 91 will have come to a stop against tie rod 87 after having slightly overshot the alignment between joints 86 and 92, whereby compass 89–90 forming a toggle joint is locked.

When all of tap 18 falls freely on outlet 6, as previously mentioned, the automatic pawls will spread apart and will tension springs 93 because of the passage of the rounded end of 85 on flange 13. Once beyond this flange, the pawls fall back into their initial positions, shown in FIG. 7, under the influence of spring 93, thereby ensuring locking of tap 18 on terminal 9 of the outlet.

In order to achieve the desired hydraulic connection, valve 10 still must be opened against the water pressure, so that a much larger force than supplied from the weight of the moving parts is required. To that end, water tap 18 is axially crossed by the hollow rod 94 of a membrane jack consisting of a cap 95 and a membrane 96 which power drives rod 94 downward when its upper face is subjected to water pressure from the channel 97 which is drilled in the axle of rod 94 and communicates at its lower part with one or more transverse orifices 98.

A distributor pushrod 99 is mounted around the lower end of this rod 94, which may move in a restricted manner with respect to the rod, for instance by means of a pin 100 crossing the rod and moving about in a slot 101 fashioned in rod 99. A spring 102 precisely pushes this rod 99 towards the lower end of its path, at which position the two toroidal seals 103 encompassing groove 104 will be both located above orifice 98. In this manner, in the rest position, the pressure above membrane 96 will pass through channel 97 and orifice 98 inside the water tap, and membrane 96 and its rod 94 will be at the upper part of their path, as shown in FIG. 6.

Simultaneously with the locking of the automatic pawls 84 as described above, the upper end of rod 11 of valve 10 will push back the distributor pushrod 99 to the upper part of its path, compressing spring 102. Very little force is required because the course is short and there are no opposing hydraulic forces.

When pushrod 99 is thus plunged on rod 94 in the position shown in FIG. 6, orifice 98 will issue into groove 104 between the two seals 103. The groove is constantly supplied with water under pressure by means of a narrow tube joined to a terminal 106. This water under pressure is distributed in that case through orifice 98 and channel 97 into the upper chamber of the membrane jack, so that sufficient force will be exerted on the rod 94 to plunge, through the intermediary of pushrod 99, rod 11 which will then open valve 10 and allow water from the supply line to enter the water tap.

The water supply thus being ensured by the new tap 18, the previous one must be immediately removed from the outlet to which it is connected, or else cable 79, which is fastened at both ends, will block forward vehicle motion. However, in order to allow enough time for the operations that were just described, each of carts 23 is fastened to the corresponding strand of cable 79 by the intermediary of springs 107, as shown in FIG. 5, each of these springs resting on one of the end plates 108 and on central cartridge 109, the latter being locked to the cable. In the course of the above operations, the vehicle therefore advances slightly, so that springs 107 located at the front of the two carts 23 are compressed.

In order to obtain the automatic release of that tap 18 which had been previously connected, use is made of a remote control release device which may be made up of, as shown in FIG. 6, a second membrane jack formed of the upper cavity 110 of body 41, the cavity being closed by a membrane 111 solidly fastened to a cartridge 112. The latter slides freely but hermetically around rod 94 and comprises a groove 113 which acts on the forkshaped end 114 of a lever 115 which is shown in FIGS. 6, 7 and 8. The lever is hinged at 116 on a terminal welded inside sleeve 117 which is locked between the two membranes 96 and 111 by means of screws (not shown.) This sleeve comprises a slot 118 through which passes the end of lever 115.

In order to unhook the automatic pawls 84, it will suffice to drive the two axles 91 beyond the alignment of axles at 86, 88, 92, so that joints 92 may rise while continuing to fold toggle joint 89, 90 under the influence of the water pressure tending to lift the water tap and hence joint 86. The moment part 85 is sufficiently inclined, this push will include a horizontal component directed outward which will cause automatic release. Spring 93 then will bring the entire system back to its initial rest position.

The moment there is release, the water pressure and the spring 12 force project the tap upward. Then cart 23, now free, advances on account of the expansion of the previously compressed springs 107, as described above; therefore the tap may no longer fall back on the outlet.

The spreading of joints 91 in the direction of arrows 119 is obtained by means of a part 120 in the form of a jointed stirrup hinging about an axis 121, as shown in FIGS. 6, 7 and 8. The ends of the branches of this stirrup elbow outwards and terminate in a slanted section 122 serving as a cam while simultaneously driving the two joints 91 outwardly by acting on the extension of the axle of these joints when the stirrup tips in the sense shown by arrow 123. Two parts 124 constituting a terminal within which the lower end of a vertical tie rod 126 hinges at 127 are welded on the back of the stirrup and the tie rod's upper end hinges at 129 on top of cap 95. The whole therefore makes up a hinged parallelogram, and it is clear that it will suffice to actuate tie rod 126 downward in order to achieve automatic release as described above.

In order to cause this action, the end of lever 115 being actuated by the membrane jack 111 comprises a hinge 130 connected to hinge 125 by another compass forming toggle joint and consisting of two small bars 131 and 132, each consisting to two symmetrically located parts and being jointed with respect to one another by means of an axle 133 that will come to a stop against tie rod 126 in a suitable hollow so that axle 133 slightly overshoots the alignment of axles 130 and 125 shown in FIG. 6. One or two springs 134 positioned about the axle 133 and acting on axles 130 and 125 will constantly load axle 133 in the direction of tie rod 126. Lastly, two stops 135, symmetrically located on either side of bar 132, are so arrayed that just before termination of the downward path of axle 130 under the influence of the hydraulic membrane 111, they will hit parts 124 and cause the tipping outward of bar 132 so that axle 133 will be forced beyond the alignment of axles 125 and 130. At that moment bars 131, 132 will continue to fold under the influence of spring 136 bringing bar 126 upward again, even though hinge 130 will continue to descend under the influence of the push from membrane 111. Thereby, axles 91 will be freed from contact with banks 122 so as to release their motion.

In summary, in order to release water tap 18 from an outlet to which it is connected, it will be enough to send up a water pressure into chamber 110, which is done by means of a channel 137 branching on a connector 138. Tube 137 is of small diameter, as is the case for the previously discussed tube 105, and passes through the inside of the jointed chain and its flexible hose.

Figure 10:
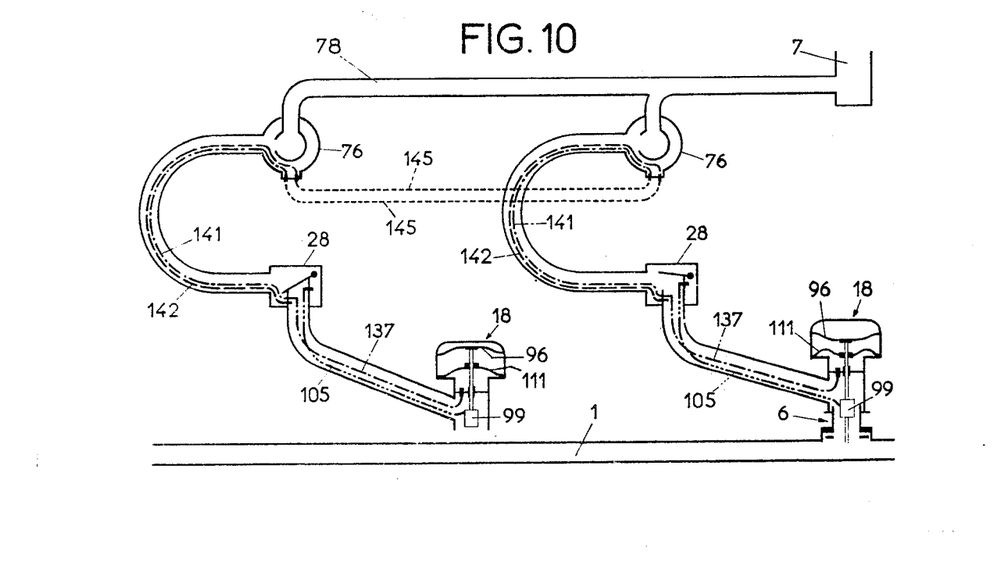
FIG. 10 is an overall view showing the hydraulic hookups.

In order to understand the overall operation of the whole apparatus, it will suffice to consider FIGS. 4 and 10 which show that tube 105 is connected to a connector 139 crossing the wall of pipe 29 and hence establishing communication from the inside of this pipe to the inside of the valve box 28 downstream of this valve, that is, in that part which is always supplied under pressure by one or the other water tap as long as the apparatus is properly functioning. This situation applies to each of the water taps. Also, tube 137 crosses the wall by a connector 140 and extends into another tube 141.

Lastly, there is another flexible tube 142 of small diameter inside the jointed pipe, communicating by means of a connector 143 with the inside of pipe 29. This tube 142 therefore is supplied with water under pressure only if the water tap of the associated side is under pressure, since otherwise the pressure will be retained downstream of valve 31 and by the latter.

Figure 9:
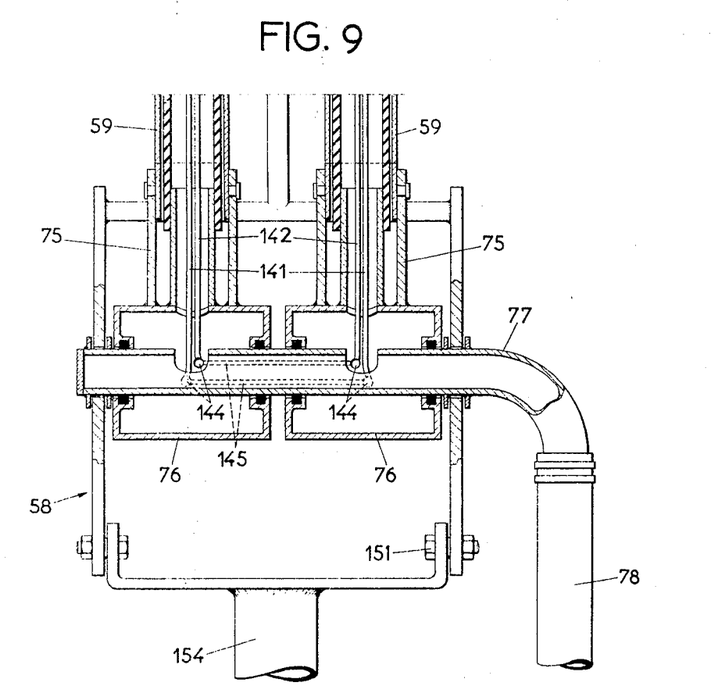
FIG. 9 is a horizontal section on a larger scale along line IX—IX of FIG. 1.

Tubes 141 and 142 extend along the entire length of each of the jointed pipes as far as the rotating connectors 76, which can be seen in FIG. 9, where they cross the walls of the connectors by means of suitble fittings 144 and are interconnected by other flexible hoses 145, each of which latter will join one of tubes 141 with the tube 142 of the other conduit and vice-versa. FIG. 10 shows in schematic form and clearly the complete interconnection of these pipes, tubes and hoses.

The schematic shows that the tap 18 which is connected to outlet 6 is equipped with an upper jack 96 supplied from pushed-in distributor 99, tube 105 remaining under pressure. Membrane 96 therefore is in the low position. On the other hand, membrane 111 is free from pressure and therefore also in the low position because its supply tube 137 is communicating with the inside of arm 39 of the other tap 18 downstream of the valve via tube 141, one of tubes 145 and tube 142 of the other conduit; hence, the membrane is also in an area free from pressure. On the other hand, as regards the unconnected tap 18, distributor 99 will not apply pressure to its upper jack which will be in the high position, the lower jack equally being in the high position and supplied by tube 137 communicating via tube 141, the other tube 145 and tube 142 of the other conduit with the inside of arm 39 of the other tap under pressure. In summary, both membranes are in the low position as regards the connected tap and both are in the high position as regards the unconnected one.

Nevertheless it may be seen that when membrane 111 is in the high position at the end of its path, axle 130 will be in the low position while axle 125 will be in its highest position because of the folding of bars 131, 132 releasing actuation of automatic pawls 84. Hence, the moment the unconnected tap will place itself on a new outlet in the manner described above, there will be automatic mechanical locking of the outlet in the manner described, then opening of corresponding valve 10 because of distributor 99 controlling membrane 96, and, when pressure is established in the corresponding arm, tube 142 is supplied on the side of the previously disconnected tap that has been connected, this pressure therefore being transmitted to membrane 111 of the other tap, that is, to the one presently connected and to be released. However, as the latter membrane previously was in the low position, that is, bars 131, 132 were locked, the pressure will effect automatic release of the pawls in the manner described above.

The release of this water tap therefore will cause a drop in pressure in the corresponding arm and will shut the corresponding valve 31, so that the pressure will drop in tube 142 and hence in tubes 141 and 137 of the newly connected tap. The pressure in the latter then will drop below membrane 111 so that the latter as well as membrane 96 will be in the low position, the situation now being the same as initially considered except for the permutation of the roles of the two water taps.

For the sake of reliability, should there be operational failure in all or any of these hydraulic connectors, or in the case of lack of water, a stop (not shown) is provided to the rear of beam 19 so as to meet the vertical branch of the elbowed return part 128 to cause a last recourse tipping of stirrup 120 and the release of the rearmost tap. As a variation, remote control disconnection may be obtained by the tension of cable 79 actuating the tie rod 126 via a suitable transmission.

On the other hand, it has been seen that the entire apparatus will operate automatically from the time tube 105 is constantly supplied under pressure. It will nevertheless be necessary to provide a special arrangement for priming operation when no tap yet is connected and hence when water pressure does not yet exist downstream of the valves. To that end, provision is made for a simple push rod 146, shown in FIG. 6, which crosses cap 95 in a hermetic sleeve and which will act on the upper part of rod 94. By making use of a lever or any pushing means, it will be possible in this manner, once a first tap has been placed on an outlet, to effect plunging of rod 94 and hence achieve opening of valve 10 in order to prime the operation. Thereafter, operation will be entirely automatic.

Figure 3:
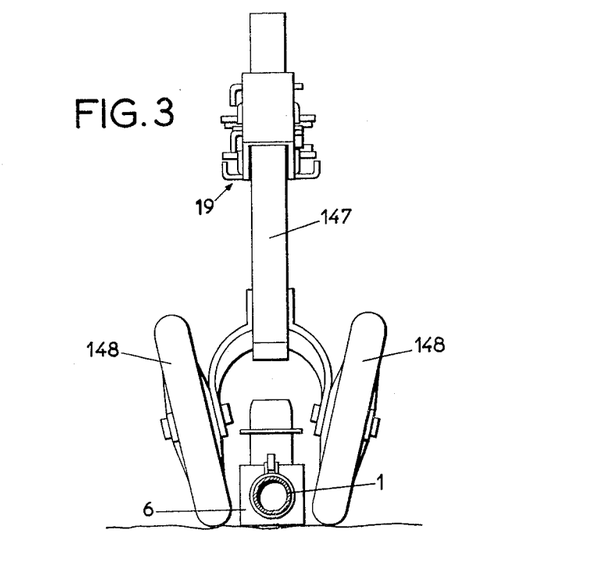
FIG. 3 shows a front view along line III of FIG. 1 on a larger scale.

In order to ensure automatic operation, it merely will be necessary that beam 19 be constantly maintained at a desired distance above the line of pipes 1 and parallel to the line. To that end, a fork 147 comprising two wheels 148 with slanted axles and rolling on the ground on either side of the line of pipes is fastened at the front of beam 19, as shown in FIG. 3, the wheel base being sufficient to allow clearance for outlets 6. Further, the beam set is so mounted that it may essentially pivot with respect to the center of its lengthwise direction. A servo system amplifies the slight angular displacements of the beam so as to control power steering acting on steering wheel 16. In this manner, the wheel will automatically guide itself along the line of pipes and will always keep the beam in the position sought after above the tube.

However, in order to allow putting the apparatus in service on the line of pipes and to permit its removal at the end of operation, the beam is provided with a lifting mechanism which may for instance consist of two jointed tie rods 149 hinging about their base at 150 about the beam and at 151 as regards their upper parts, one of these joints 151 being near connector 58 on collector 77, the whole constituting a jointed parallelogram. The lifting of the beam is achieved by means of a hoist with a hydraulic jack 152, of which cable 153 will be returned essentially along a diagonal of the parallelogram. Hence, by supplying oil to jack 152 the beam is lifted.

Thus, it is an upper lengthwise support 154 holding joints 151 and jack 152, and the return pulley, that hinges about a vertical axle 155 on the vehicle frame, which control the power steering direction by their pivoting.

It is seen that regarding the water supply of the invention, it will suffice on one hand to array on the ground the line of pipes 1 and outlets 6 along the selected path and, on the other hand, to position the vehicle at the start of the line by placing the steering wheels 148 on both sides of the line and to move the vehicle forward until a first water tap 18 locks onto an outlet 6, and lastly to prime the supply by acting on equipment 146 in the manner previously discussed. Consequently, the vehicle will follow the entire length of the line at the desired speed, the path conceivably including large radius turns, thereby achieving systematically high output sprinkling over large ranges, without needing to worry about the water supply which is automatically ensured and continuously so by the two taps 18 of which at least one will be always connected. Because of this continuity of supply and because the forward vehicle speed generally will be very low, hence requiring but little power, one may also stop the driving heat engine of the vehicle and put a turbine in the water supply path between 58 and 17 in order to tap some power which will be geared down and transmitted to the drive wheels 15 by means of a variable transmission, for instance of the hydraulic type. Thus, all of the sprinkling operation may be performed from the sole supply of water.

It is self-evident that the embodiment described above in no may entails any limitation as to characteristics and may be varied in any desirable manner without thereby exceeding the scope of the invention. In particular, the kind of support and guidance relating to the water taps 18 may be rearranged in any manner. Similarly, their crossing action by laterally swinging out of the way may be replaced by a crossing with upward withdrawal, the return outlet passing above the outlet being tapped. Furthermore, observing that the water taps need be guided with high accuracy only in the front path of their course, it may be feasible to eliminate the rear part of the beam and to replace it with support means and guidance means of a more elementary nature that will merely ensure return carriage of the relased taps.

What is claimed is:

1. A water supply apparatus for a vehicle carrying sprinkling equipment comprising:
   a. stationary facility located on the ground and including a line of pipes having from place to place a water outlet, and a spring valve for opening and closing each water outlet; and
   b. a movable facility borne by the vehicle and including two water taps which are alternately releasably connected to said outlets, a pair of carts, each of which bears one of said taps and is movable with respect to the vehicle, guide means, provided on said vehicle, for supporting and guiding said two carts as to lengthwise motion of said two carts with respect to the vehicle, said supporting and guiding means including two separate ways on which said carts are supported and guided, a common pipe collector secured to said supporting and guiding means, two flexible hoses each linking one of said carts to said common pipe collector, a pulley rotatably mounted at a front end of said supporting and guiding means, a return cable connecting both said carts and passing over said pulley, said return cable and said pulley ensuring return passage from rear to front of the vehicle of one tap that is disconnected from one outlet because of relative motion of the vehicle and the other tap which is connected to another outlet, movable connecting means, linking each tap to a corresponding cart, for ensuring lateral or vertical release of said one tap, which is disconnected and returns to the front of the vehicle, with respect to said other tap connected to said another outlet when said one and said other taps cross each other, and hydraulically actuated means, borne by both said taps, for automatically securing connection of said one tap disconnected from said one outlet to said another outlet to which said one tap is to be connected and simultaneously releasing said other tap connected to said another outlet.

2. A water supply apparatus as defined in claim 1 wherein said movable connecting means includes for each of said taps a movable arm which supports vertically and horizontally a tap, and wherein said supporting and guiding means includes a beam extending lengthwise of the vehicle and including at the front of said beam steering wheels rolling on the ground on either side of said line of pipes, said two carts sliding laterally on two sides of said beam, and a beam support approximately secured at the middle of the length of said beam and jointed with play to the vehicle about a vertical axle, and further comprising two valve boxes each supported by one of said carts and connected to one of said taps by the movable arm, and an automatic control means, connected to the vehicle, for amplifying the play of the joint which is due to deviation of the vehicle relative to said line of pipes to control power steering of the vehicle.

3. A water supply apparatus as defined in claim 2 wherein said flexible hoses link said common connector to each valve box connected to a cart and include a chain jointed about horizontal axes, and in which each link of said chain includes limit stops restricting angular play to a radius of minimum curvature in one direction and to straight alignment in the other, each hose being in the form of a prone U of which the back will be of the minimum curvature and of which the upper arm remains rectilinear solely on account of said stops, and further comprising rollers, ganged to the links of the chain, the lower arm resting on said rollers and borne by said beam.

4. A water supply apparatus as defined in claim 2 wherein said vertical axle is vertically movable relative to the vehicle and power actuated to permit the lifting of said movable facility and the lowering of the same in due place on said line of pipes.

5. A water supply apparatus as defined in claim 1 further including a joint rigidly fastened to each outlet and wherein each water tap includes automatic pawls each formed by an essentially horizontal hooking part with an end hooking onto said joint rigidly, fixed length tie rod means near the hooking point,     compass means forming a toggle joint at the opposite end from the hooking point, said end being hooked onto said joint by said tie rod and compass means, a common spring which is mounted between said compass means and said tap and ensures that a pawl will return to the hooking position and that the toggle joint will lock, and further including for each tap mechanical control means, priming bending of said toggle joint, for automatically releasing said toggle joint from being locked.

6. A water supply apparatus as defined in claim 5 further including means for activating said mechanical control means of one tap, said activating means including a first small hose and a first jack hydraulically linked by said first small hose with the inside of the other tap to cause release of the pawls and of the one tap when the latter is supplied under pressure.

7. A water supply apparatus as defined by claim 6 wherein a tap also includes a second hydraulic jack, an axial rod which is actuated by said second hydraulic jack, a distributor pushrod which is constantly supplied with water under pressure and to which said axial rod is connected, said axial rod having a channel which communicates with said second jack and the water pressure applied to said pushrod, and a second small hose connected to a corresponding valve box for supplying water under pressure to said pushrod, and wherein said spring valve includes a rod on which said pushrod rests, whereby automatic locking of said pawls due to the drop of said tap on an outlet causes plunging of said distributor pushrod which will apply water pressure to said second jack through said channel, said second jack then pushing against said axial rod and causing opening of said spring valve of an outlet.

* * * * *